US009621041B2

(12) United States Patent
Sun et al.

(10) Patent No.: US 9,621,041 B2
(45) Date of Patent: Apr. 11, 2017

(54) BUCK-BOOST CONVERTER CONTROL CIRCUITS AND TECHNIQUES

(71) Applicant: Allegro Microsystems, LLC, Worcester, MA (US)

(72) Inventors: Xiaowu Sun, Nashua, NH (US); Bassem Alnahas, Manchester, NH (US)

(73) Assignee: Allegro Microsystems, LLC, Worcester, MA (US)

( * ) Notice: Subject to any disclaimer, the term of this patent is extended or adjusted under 35 U.S.C. 154(b) by 34 days.

(21) Appl. No.: 14/615,050

(22) Filed: Feb. 5, 2015

(65) Prior Publication Data
US 2016/0233767 A1    Aug. 11, 2016

(51) Int. Cl.
*H02M 3/158*    (2006.01)
*H02M 1/00*    (2006.01)

(52) U.S. Cl.
CPC ......... *H02M 3/158* (2013.01); *H02M 3/1582* (2013.01); *H02M 2001/0048* (2013.01); *Y02B 70/1491* (2013.01)

(58) Field of Classification Search
CPC ........... H02M 1/08; H02M 2001/0009; H02M 3/1582; H02M 3/1588; H02M 3/158; H02M 3/156; H02M 3/33507; H02M 2001/0048; G05F 1/24
See application file for complete search history.

(56) References Cited

U.S. PATENT DOCUMENTS

| | | | | |
|---|---|---|---|---|
| 6,977,488 B1 * | 12/2005 | Nogawa | ............... | H02M 3/1582 323/222 |
| 6,984,967 B2 | 1/2006 | Notman | | |
| 2005/0156658 A1 * | 7/2005 | Ikezawa | ............... | H02M 3/1582 327/508 |
| 2005/0206354 A1 * | 9/2005 | Ikezawa | ............... | H02M 3/1582 323/248 |
| 2005/0236904 A1 * | 10/2005 | Ikezawa | ................ | H02M 1/143 307/112 |
| 2007/0052395 A1 * | 3/2007 | Belch | .................. | H02M 3/1582 323/222 |
| 2009/0058388 A1 * | 3/2009 | Kanakubo | ........... | H02M 3/1582 323/288 |
| 2009/0262556 A1 * | 10/2009 | Tomiyoshi | .......... | H02M 3/1582 363/17 |
| 2011/0006743 A1 * | 1/2011 | Fabbro | ................ | H02M 3/1582 323/282 |

(Continued)

OTHER PUBLICATIONS

"Adjustable Frequency Buck or Buck/Boost Pre-Regulator with a Synchronous Buck, 3 Internal LDOs, Window Watchdog Timer, and NPOR", A4410 Datasheet of Allegro Microsystems, Inc. Data Sheet, 41 pages, dated 2014.

(Continued)

*Primary Examiner* — Gustavo Rosario Benitez
(74) *Attorney, Agent, or Firm* — Daly, Crowley, Mofford & Durkee, LLP (57) ABSTRACT

A controller for a Buck-Boost converter includes a feedback control circuit responsive to the converter output and configured to generate a control signal for the Buck switch and a feed forward control circuit responsive to the input voltage and configured to generate a control signal for the Boost switch. The feed forward circuit is decoupled from the converter output and may be programmable to select a predetermined output voltage.

15 Claims, 7 Drawing Sheets

(56) References Cited

U.S. PATENT DOCUMENTS

| | | | | |
|---|---|---|---|---|
| 2013/0307508 A1* | 11/2013 | Hallak | ................ | H02M 3/1582 |
| | | | | 323/282 |
| 2013/0320949 A1* | 12/2013 | Prexl | .................... | H02M 3/158 |
| | | | | 323/290 |
| 2015/0303807 A1* | 10/2015 | Garvey | .................. | H02M 1/08 |
| | | | | 323/271 |

OTHER PUBLICATIONS

"Buck or Buck/Boost Pre-Regulator with Synchronous Buck, 5 Internal Linear Regulators, Pulse Width Watchdog Timer, and SPI", A4412 Datasheet of Allegro Microsystems, Inc., 47 pages, dated Jan. 6, 2014.

* cited by examiner

BUCK-BOOST CONVERTER CONTROL CIRCUITS AND TECHNIQUES

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to DC-DC converters and, more particularly, to control circuits and techniques for Buck-Boost DC-DC converters.

BACKGROUND OF THE INVENTION

DC-DC converters are used in a wide range of applications to provide a regulated output voltage from a battery or other power source. Switch-mode or switching DC-DC converters use an energy storage device, such as an inductor, to store the input energy and switches to selectively couple the energy storage device to the output.

Common switching converter topologies include Buck, Boost, Buck-Boost, —, SEPIC, Cúk, half bridge, and full bridge to name a few. In Buck converters, the output voltage is lower than the input voltage, in Boost converters, the output voltage is higher than the input voltage, and in Buck-Boost converters, the output voltage can be either higher or lower than the input voltage but ideally is relatively close to the input voltage. Buck-Boost converters are advantageous in applications with widely varying input voltage ranges, such as in automobiles where the battery voltage can vary widely between start up conditions of a few volts to spikes as high as 40 or 50 volts under certain load conditions, since the converter can be configured to operate in a Buck mode, a Boost mode, or a Buck-Boost mode of operation.

Figure 1:
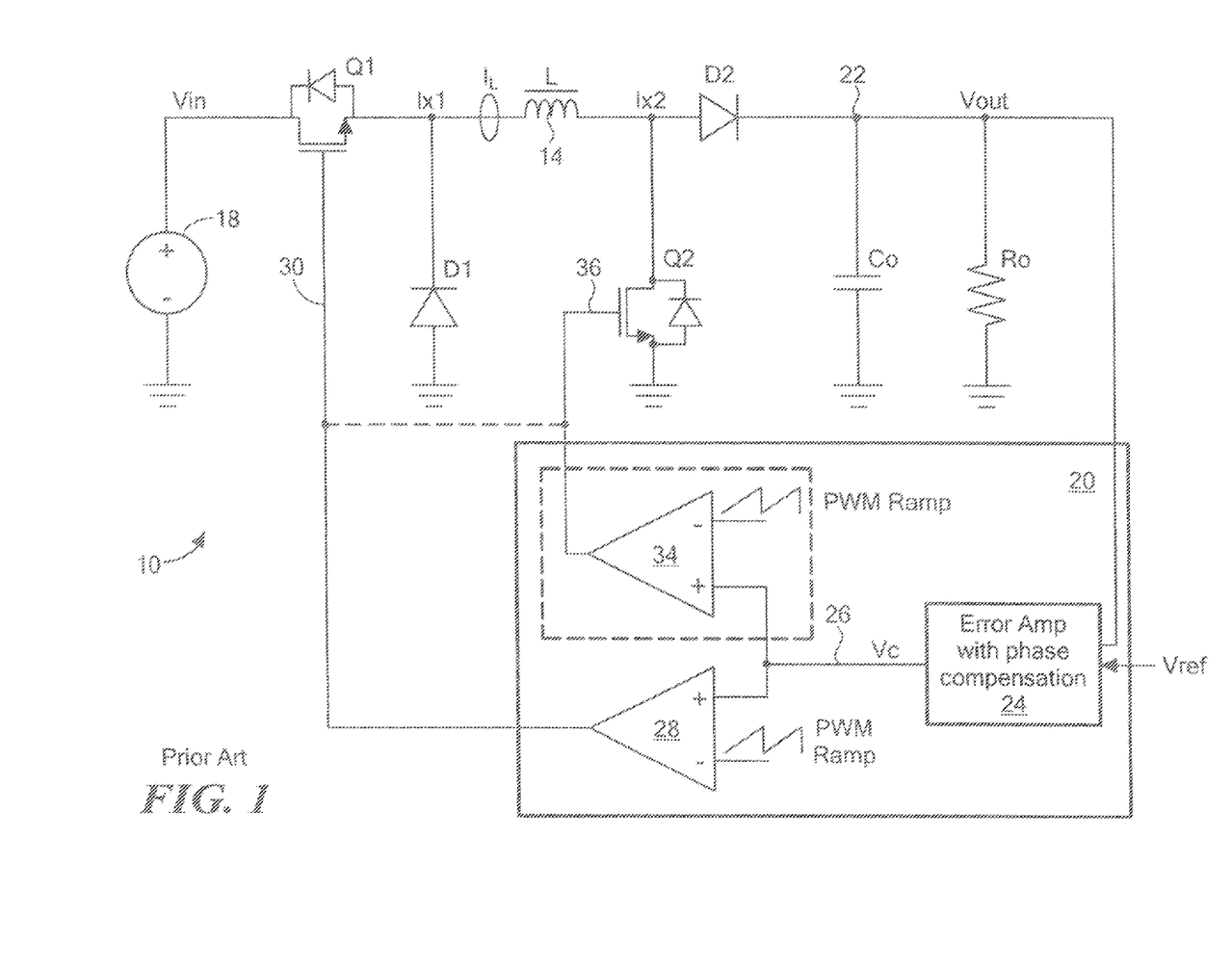
FIG. 1 illustrates a conventional Buck-Boost converter.

FIG. 1 illustrates a conventional Buck-Boost converter 10 in which an inductor 14 is selectively coupled to an input voltage source 18 to store energy when switches Q1 and Q2 are both on or decoupled from the input voltage source to transfer energy to the load Ro at the converter output 22 through diodes D1 and D2 when switches Q1 and Q2 are both off in a Buck-Boost mode of operation. The converter 10 can be configured to operate in a purely Buck mode of operation by keeping switch Q2 off, as may be desirable when the input voltage is significantly higher than the desired output voltage or in a purely Boost mode of operation by keeping switch Q1 off, as may be desirable when the input voltage is significantly lower than the desired output voltage.

A control circuit 20 controls the duty cycle of conduction of the switches Q1 and Q2 based on feedback from the converter output 22 in order to provide the output voltage Vout at a desired, predetermined regulated voltage level. For example, the control circuit 20 may include an error amplifier 24 to generate an error signal Vc, 26 based on a difference between the converter output 22 and a reference signal Vref. The control circuit 20 may further include a comparator 28 to compare the error signal Vc to a Pulse Width Modulation (PWM) ramp signal to generate a switch control signal 30 for coupling to the gate terminal of stitches Q1 and Q2. In some converters, the switches Q1 and Q2 may be independently controlled, in which case an additional comparator 34 may be provided to generate a control signal 36 to the gate terminal of switch Q2. Such independent control of the switches Q1 and Q2 permits the converter 10 to be configured in a Buck mode of operation or in a Boost mode of operation and also permits a third phase of Buck-Boost operation (i.e., operation with one of the switches Q1 and Q2 on and the other one off) as may be desirable to reduce losses and improve efficiency when transitioning between switch phases.

SUMMARY OF THE INVENTION

According to an aspect of the disclosure, a controller for a Buck-Boost converter including a Buck switch coupled between an input voltage and an inductor and a Boost switch coupled to the inductor and through an output switch to an output of the converter at which an output voltage is provided includes a feedback control circuit responsive to the converter output and configured to generate a first control signal for one of the Buck switch and the Boost switch and a feed forward control circuit responsive to the input voltage and configured to generate a second control signal for the other one of the Buck switch and the Boost switch. In an embodiment, the feedback control circuit is configured to generate the control signal for the Buck switch and the feed forward control circuit is configured to generate the control signal for the Boost switch.

Features may include one or more of the following. The feed forward control circuit may be programmable. To this end, the feed forward control circuit may include a programmable device selected based on a predetermined level for the output voltage, such as a resistor. The feed forward control circuit may be designed to provide a Boost switch duty cycle $D_{boost}$ substantially given by:

$$D_{boost} \cong 1 - \frac{D^0_{buck}}{V^0_{out} + V_{fb}} \times Vin$$

where Vin is the value of the input voltage, $V_{fb}$ is a diode drop, $D_{buck}^0$ is a desired duty cycle of the Buck switch when the converter transitions between a Buck mode of operation and a Buck-Boost mode of operation, and $V_{out}^0$ is a predetermined level for the output voltage.

The feedback control circuit may include an error amplifier responsive to a feedback signal from the converter output and to a reference signal to generate an error signal proportional to a difference between the feedback signal and the reference signal and a comparator responsive to the error signal and to a PWM ramp signal to generate the first control signal. The feedback control circuit may implement voltage mode control or the PWM ramp signal may be based in part on a current through the inductor in which case the feedback control circuit implements current mode control.

Also described is a controller for a Buck-Boost converter including a feed forward control circuit responsive to the input voltage and configured to generate a control signal for the Boost switch, wherein the feed forward control circuit is decoupled from the converter output. The feed forward control circuit may be programmable and may include a programmable device selected based on a predetermined level for the converter output voltage, such as a resistor.

According to a further aspect of the disclosure, a Buck-Boost converter to supply a regulated output voltage at an output node includes an inductor having first and second terminals, a first switch coupled between an input voltage and the first terminal of the inductor, a second switch coupled between the first terminal of the inductor and a reference voltage, a third switch coupled between the second terminal of the inductor and the output node, a fourth switch coupled between the second terminal of the inductor and the reference voltage, a feedback control circuit responsive to the output voltage and configured to generate a control signal for the first switch, and a feed forward control circuit responsive to the input voltage and configured to generate a control signal for the fourth switch.

In an embodiment, the converter may be operable in (1) a Buck mode of operation in which the first switch is turned on and off according to a Buck duty cycle and the fourth switch is off; or (2) in a Buck-Boost mode of operation in which the first and fourth switches are on during a first phase and the first and fourth switches are off during a second phase, wherein the first and second phases occur according to a Boost duty cycle. The duty cycle of the fourth switch (i.e., the Boost duty cycle) may be given by:

$$D_{boost} \cong 1 - \frac{D_{buck}^0}{V_{out}^0 + V_{fb}} \times Vin$$

where Vin is the value of the input voltage, $V_{fb}$ is a forward voltage drop of the third switch, $D_{buck}^0$ is a desired duty cycle of the Buck switch when the converter transitions between the Buck mode of operation and the Buck-Boost mode of operation, and $V_{out}^0$ is a predetermined level for the output voltage. The Buck-Boost mode of operation may further include a third phase in which the first switch is on and the fourth switch is off.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more example embodiments. Accordingly, the figures are not intended to limit the scope of the invention. Like numbers in the figures denote like elements.

DETAILED DESCRIPTION OF THE INVENTION

Figure 2:
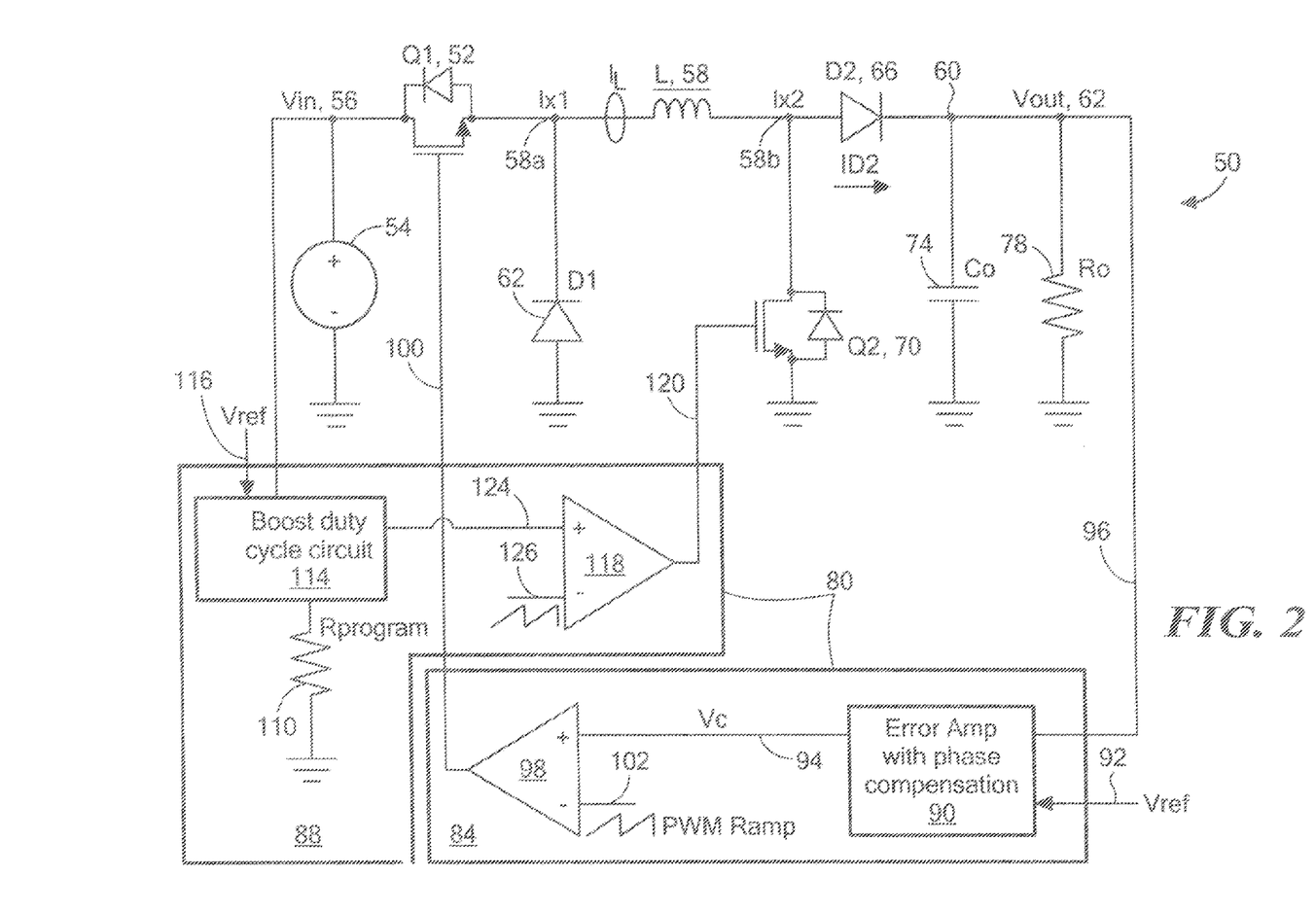
FIG. 2 is a circuit diagram of a Buck-Boost converter in accordance with an embodiment.

Referring to FIG. 2, a Buck-Boost converter 50 includes a first switch Q1, 52 (sometimes referred to as a Buck switch) coupled between an input voltage source 54 that provides an input voltage Vin, 56 and a first terminal 58a of an inductor 58. A second switch 62, here in the form of a diode D1, 62 is coupled between the first terminal 58a of the inductor 58 and ground. A third switch 66, here in the form of a diode D2, 66 is coupled between a second terminal 58b of the inductor 58 and an output terminal 60 of the converter at which an output voltage Vout, 62 is provided. And a fourth switch Q2, 70 (sometimes referred to as a Boost switch) is coupled between the second terminal 58b of the inductor 58 and ground. An output capacitor Co, 74 and a load Ro, 78 are coupled to the converter output 60, as shown. It will be appreciated that the diodes 62, 66 can be replaced with synchronous rectifier switches as may be desirable to reduce power loss.

The Buck-Boost converter 50 can operate in a Buck-Boost mode of operation in which switches Q1 and Q2 are turned on and off, a Boost mode of operation in which switch Q1 is kept on and switch Q2 is turned on and off or in a Buck mode of operation in which switch Q2 is kept off and switch Q1 is turned on and off. The duty cycle of the Buck switch Q1 may be referred to as the Buck duty cycle (i.e., $D_{buck}$) and the duty cycle of the Boost switch Q2 may be referred to as the Boost duty cycle (i.e., $D_{boost}$). Here, during the Buck-Boost mode of operation, switches Q1 and Q2 are independently controlled as described below and the Buck switch Q1 is turned on and off at the Buck duty cycle and the Boost switch Q2 is turned on and off at the Boost duty cycle. In the illustrative embodiment, the converter 50 operates predominantly in the Buck mode of operation and sometimes in the Buck-Boost mode of operation, although scenarios are possible as explained below.

Conduction of the switches Q1 and Q2 is controlled by a controller 80, here including a feedback control circuit 84 and a feed forward control circuit 88, each of which generates a respective control signal 100, 120 for switches Q1 and Q2. The feedback control circuit 84 can include an error amplifier 90 responsive to a feedback signal 96 from the converter output 60 (as may be provided by a sense resistor, not shown) and to a reference signal Vref, 92 to generate an error signal Vc, 94 proportional to a difference between the feedback signal 96 and the reference signal 92 and a comparator 98 responsive to the error signal 94 and to a PWM ramp signal 102 to generate a control signal 100 for coupling to the gate terminal of Buck switch Q1. Feedback control circuit 84 may implement voltage mode control in which case the control signal 100 establishes a duty cycle to generate a predetermined output voltage Vout or current mode control in which case the PWM ramp signal 102 is based in part on the inductor current (i.e., IL) and the control signal 100 establishes a duty cycle to generate a predetermined inductor current.

The feed forward control circuit 88 is responsive to the input voltage Vin, 56 and is configured to generate a control signal 120 for coupling to the gate terminal of the Boost switch Q2, as shown. By controlling the Boost switch Q2 with the feed forward control circuit 88 that is decoupled from the converter output 60 (rather than with a feedback control circuit for example, as is conventional), loop stability of the converter 50 is improved since a right hand plane zero that requires significantly different compensation requirements than those of the Buck feedback control loop is eliminated.

The Boost duty cycle $D_{boost}$ established by the control signal 120 is programmable in order to achieve a desired, predetermined, nominal output voltage Vout. To this end, the feed forward control circuit 88 includes a programmable device 110, here shown in the form of a resistor Rprogram, 110, a boost duty cycle circuit 114 coupled to the programmable device and responsive to a reference signal Vref, 116, and a comparator 118 that is responsive to an output signal 124 of the boost duty cycle circuit 114 and to a ramp signal 126, as shown.

The programmable device 110 is selected based on the desired, predetermined, nominal output voltage Vout and establishes the operational conditions (i.e., the relationship between the relative levels of the input voltage Vin, 56 and the output voltage Vout, 62) under which the converter 50 transitions between the different modes of operation (e.g., between the Buck mode of operation and the Buck-Boost mode of operation). More particularly, as shown below, the resistance of resistor Rprogram, 110 may be proportional to the predetermined output voltage plus the forward voltage drop of switch D2, 66.

Figure 3:
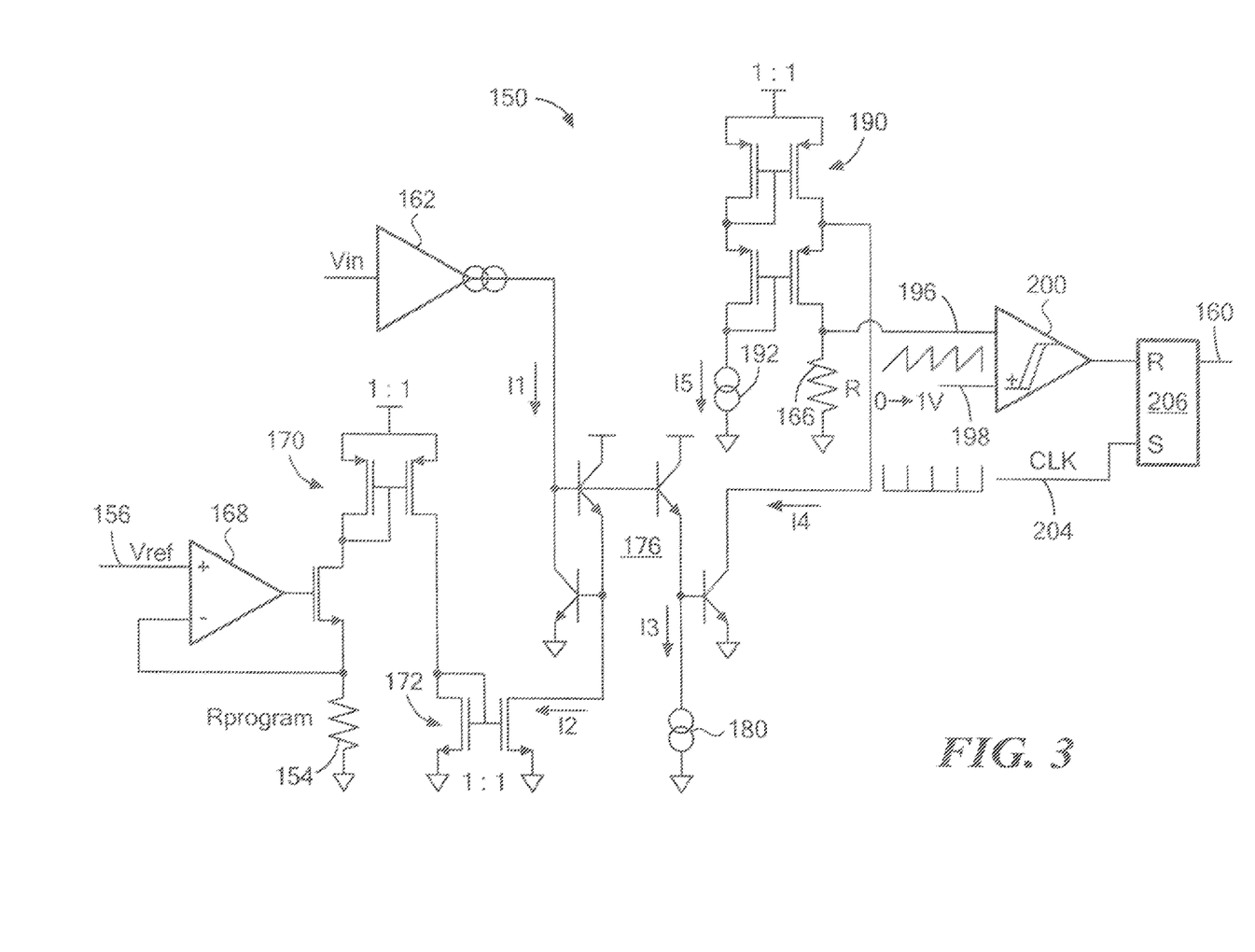
FIG. 3 is a circuit diagram of an illustrative embodiment of the Boost duty cycle circuit of FIG. 2.

Various circuitry and techniques are possible to implement the programmable feed forward control circuit 88. One example circuit is shown in FIG. 3 and described below. Before discussing the example circuit however, it is helpful to consider the desired Boost duty cycle $D_{boost}$ as generated by the programmable feed forward control circuit 88.

The transfer function of the converter 50 in the Buck-Boost mode of operation is given by:

$$Vout \cong Vin \times \frac{D_{buck}}{1 - D_{boost}} - V_{fb} \quad (1)$$

where $V_{fb}$ is the forward voltage drop of the switch D2, 66.

In order to achieve stable feed forward control of the Boost switch Q2, it is desirable to minimize the change in the Buck switch duty cycle $D_{buck}$ over variations in the input voltage Vin. Considering a simple perturbation over $V_{out}$, $V_{in}$, $D_{buck}$, $D_{boost}$, and assuming that the forward voltage drop across the diode D2 (i.e., $V_{fb}$) is substantially constant, we have:

$$\widetilde{Vout} = \quad (2)$$

$$\widetilde{Vin} \times \frac{D_{buck}}{1 - D_{boost}} + Vin \times \frac{\widetilde{D_{buck}}}{1 - D_{boost}} + Vin \times \frac{D_{buck}}{(1 - D_{boost})^2} \times \widetilde{D_{boost}}$$

In order to have a simple Buck conversion with Vout modulated by the Buck duty cycle only, or:

$$\widetilde{Vout} = Vin \times \frac{\widetilde{D_{buck}}}{1 - D_{boost}} \quad (3)$$

we need to have:

$$\widetilde{Vin} \times \frac{D_{buck}}{1 - D_{boost}} + Vin \times \frac{D_{buck}}{(1 - D_{boost})^2} \times \widetilde{D_{boost}} = 0 \quad (4)$$

or $$\frac{\widetilde{Vin}}{Vin} = -\frac{\widetilde{D_{boost}}}{1 - D_{boost}} \quad (5)$$

One solution to equation (5) for the boost duty cycle $D_{boost}$ is given by:

$$D_{boost} = 1 - C \times Vin \quad (6)$$

where C is a constant coefficient. For a specific target output voltage $V_{out}^0$ and Buck duty target $D_{buck}^0$, equation (1) can be expressed as:

$$V_{out}^0 \cong Vin \times \frac{D_{buck}^0}{1 - D_{boost}} - V_{fb} \quad (7)$$

Equation (7) can be used to express the Boost duty cycle as follows:

$$D_{boost} = 1 - \frac{D_{buck}^0}{V_{out}^0 + V_{fb}} \times Vin \quad (8)$$

Equations (6) and (8) can be used to provide the following expression for C, given a desired, predetermined value of the Buck duty cycle (i.e., $D_{buck}^0$) and the output voltage $V_{out}$ (i.e., $V_{out}^0$):

$$C = \frac{D_{buck}^0}{V_{out}^0 + V_{fb}} \quad (9)$$

where $D_{buck}^0$ is a desired Buck duty cycle when the converter 50 transitions from the Buck mode of operation to the Buck-Boost mode of operation.

Thus, the desired boost duty cycle $D_{boost}$ can be expressed as follows:

$$D_{boost} \cong 1 - \frac{D_{buck}^0}{V_{out}^0 + V_{fb}} \times Vin \quad (10)$$

In practice, it is desirable to have $0 \leq D_{boost} \leq D_{buck} \leq D_{buckmax}$, so that the converter has satisfactory dynamic controllable range.

Referring also to FIG. 3, an illustrative feed forward control circuit 150 (as may be used to provide the feed forward control circuit 88 of FIG. 2) is shown. Like the circuit 88 of FIG. 2, the circuit 150 includes a programmable device 154, here a resistor Rprogram, and is responsive to a reference signal 156 and the input voltage Vin and is configured to generate a control signal 160 which may the same as or similar to the control signal 120 (FIG. 2) for coupling to the gate terminal of Boost switch Q2. More particularly, the control signal 160 has a duty cycle given by equation (10) above.

The feed forward control circuit 150 includes a transconductance amplifier 162 to generate a first current I1 equal to the input voltage Vin multiplied by the amplifier's transconductance of 1/(M×R), where R is a resistance of a resistor 166 and M is a multiplier so that I1=Vin/(M×R). A voltage-follower-configured operational amplifier 168 is coupled to the programmable resistor 154 to generate a current proportional to the reference signal voltage Vref divided by the programmable resistance Rprogram, which current can be buffered with current mirrors 170, 172, as shown, to provide a current I2.

A transistor network 176 configured as a multiplier is responsive to the first and second currents I1 and I2 and to a current source 180 (as may have a current value of 1 volt divided by the resistance of resistor R, 166) to generate a fourth current I4 given by:

$$I4 = \frac{\frac{Vin}{M \times R} \times \frac{Vref}{Rprogram}}{\frac{1V}{R}} \quad (11)$$

The current I4 is coupled to a current mirror network 190 that has a current source I5, 192 (as may have a current value of 1 volt divided by the resistance of resistor R, 166) in a first leg and the resistor R, 166 in the second leg, as shown. A voltage across resistor 166 generates a signal 196 (which may be the same as or similar to the output signal 124 of the boost duty cycle circuit 114 of FIG. 2). The signal 196 can be expressed as a maximum as follows:

$$Vboost = \max\left(1V - \frac{Vin}{Rprogram} \times \frac{Vref}{1V} \times \frac{R}{M}, 0\right) \quad (12)$$

Signal 196 is coupled to an inverting input of a comparator 200 that has a non-inverting input responsive to a ramp signal 198 (that may be the same as or similar to the ramp signal 126 of FIG. 2) that may, for example, be a ramp signal with a voltage range of zero to 1 volt. The output of comparator 200 can be coupled to a reset input of a flip-flop 206 that is set by a clock signal 204 to generate the control signal 160 for coupling to the gate terminal of the boost switch Q2 (FIG. 2).

With the feed forward control circuit 150 of FIG. 3, Rprogram is proportional to the desired, predetermined output voltage $V_{out}^0$ and more particularly, can be expressed as follows:

$$R_{program} = (V_{out}^0 + V_{fb}) \times \frac{V_{ref}}{M \times 1V^2} \times R \quad (13)$$

It will be appreciated that various other circuits and techniques are possible to still realize the boost duty cycle expression of equation (10). For example, while the circuit 150 is a predominantly analog implementation, portions or all of the feed forward control circuit can be implemented with digital circuitry and techniques.

Figure 4:
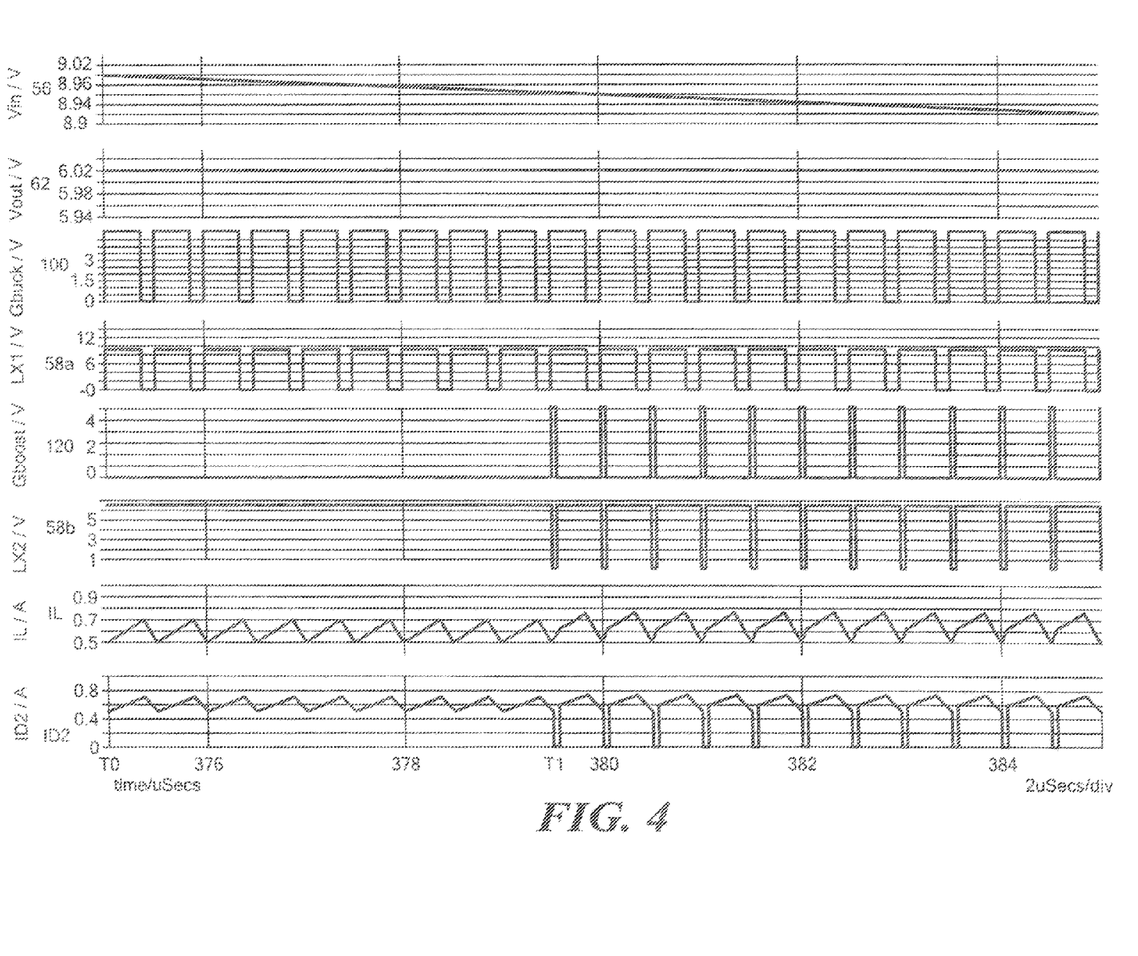
FIG. 4 shows several illustrative waveforms associated with the converter of FIG. 2.

Referring also to FIG. 4, certain waveforms associated with the converter 50 of FIG. 2 are shown, including the input voltage Vin, 56, the output voltage Vout, 62, the Buck switch control signal 100, the voltage at the first terminal 58a of the inductor 58 (i.e., LX1), the Boost switch control signal 120, the voltage at the second terminal 58b of the inductor 58 (i.e., LX2), the current through inductor 58 (i.e., IL), and the current through switch 66 (e.g., ID2). The waveforms of FIG. 4 correspond to operation of the converter 50 when the predetermined, nominal output voltage Vout, 62 is set to 6.0 volts and illustrate operation when the input voltage Vin, 56 falls from approximately 9.0 volts to approximately 8.92 volts. In this particular example, the programmable resistor Rprogram, 110 may have a value on the order of approximately 64KΩ as determined by equation (13) corresponding to a nominal output voltage (i.e., $V_{out}^0$) of 6.0 volts, a reference voltage Vref, 156 (FIG. 3) on the order of approximately 0.7V, a resistance of resistor R, 166 on the order of approximately 100KΩ (FIG. 3), and a Buck duty cycle at the transition from Buck mode to Buck-Boost mode (i.e., $D_{buck}^0$) on the order of approximately 0.7, or 70%, a value M of 10, and a forward voltage drop $V_{fb}$ of switch 66 on the order of approximately 0.4 volts.

During a first time period from T0 to T1, the converter 50 operates in the Buck mode in which Boost switch Q2 is off (control signal 120 is low) and Buck switch Q1 is turned on and off at a Buck duty cycle sufficient to maintain the output voltage constant. When the input voltage Vin, 56 falls to approximately 8.96 volts at a time T1, the converter transitions to the Buck-Boost mode of operation in which both the Buck switch Q1 and the Boost switch Q2 are turned on and off. More particularly, here, three phases of Buck-Boost operation are implemented. During each Buck-Boost cycle, switches Q1 and Q2 are simultaneously on during a first phase, the Buck switch Q1 is on and the Boost switch Q2 is off during a second phase, and both the Buck switch Q1 and the Boost switch Q2 are off during a third phase, as shown.

Figure 5:
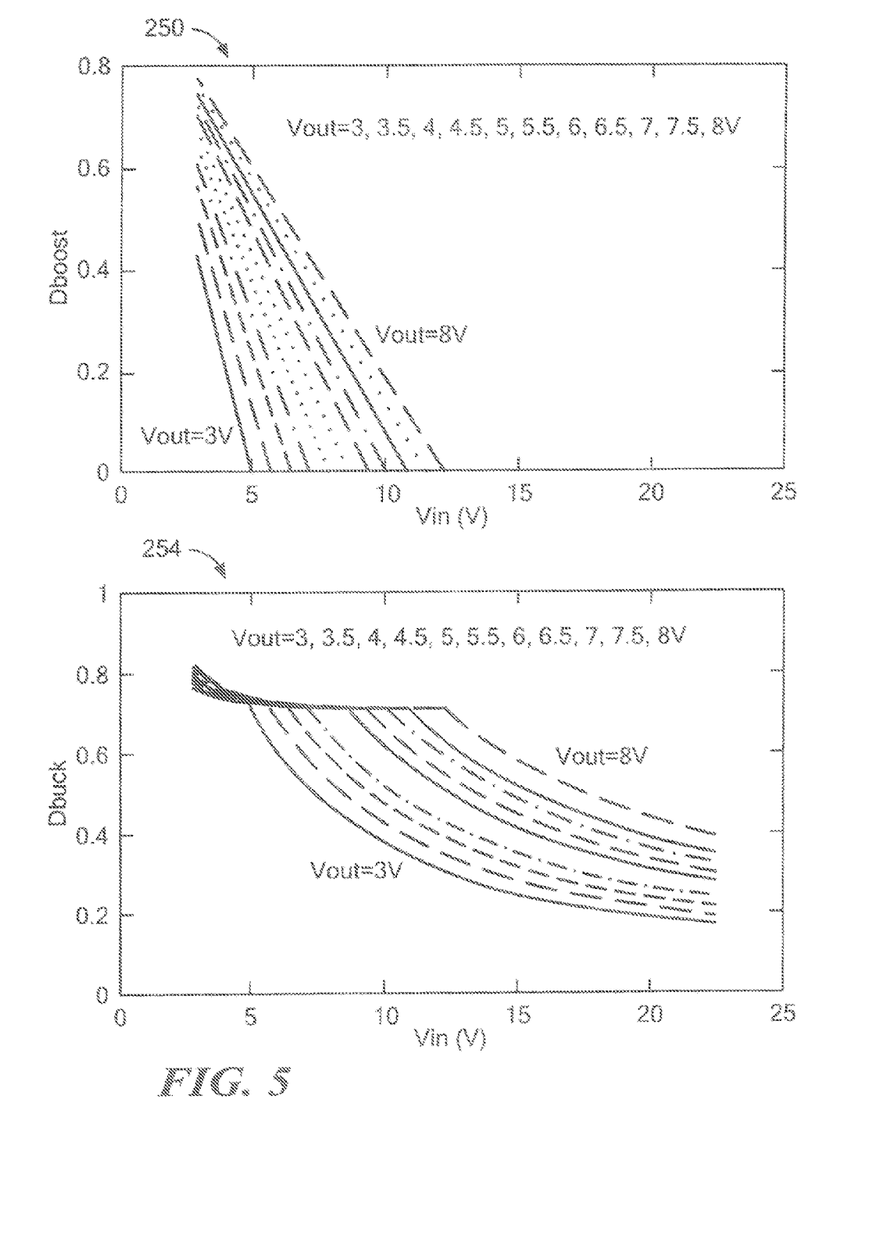
FIG. 5 shows illustrative plots of the Buck switch duty cycle versus input voltage for various output voltages and of the Boost switch duty cycle versus input voltage for various output voltages.

Referring also to FIG. 5, a first plot 250 illustrates the relationship between the Boost switch duty cycle $D_{boost}$ and input voltage Vin for different values of output voltage Vout. A second plot 254 illustrates the relationship between the Buck switch duty cycle $D_{buck}$ and input voltage Vin for various values of output voltage Vout. As explained above, selection of the resistance of programmable resistor Rprogram, 110 (FIGS. 2 and 3) determines the nominal output voltage level.

It will be appreciated that while the converter 50 of FIG. 2 is described as operating in an application in which the converter predominantly is in the Buck mode of operation, less in the Buck-Boost mode of operation, and never (or hardly ever) in the Boost mode of operation, other applications are possible. For example, in an application in which the input and output voltage conditions require the converter to operate predominantly in the Boost mode of operation, it may be desirable to "swap" the control circuits 84, 88, so that the Buck switch is under the feed forward control of control circuit 88 and the Boost switch is under the feedback control of control circuit 84.

Figure 6:
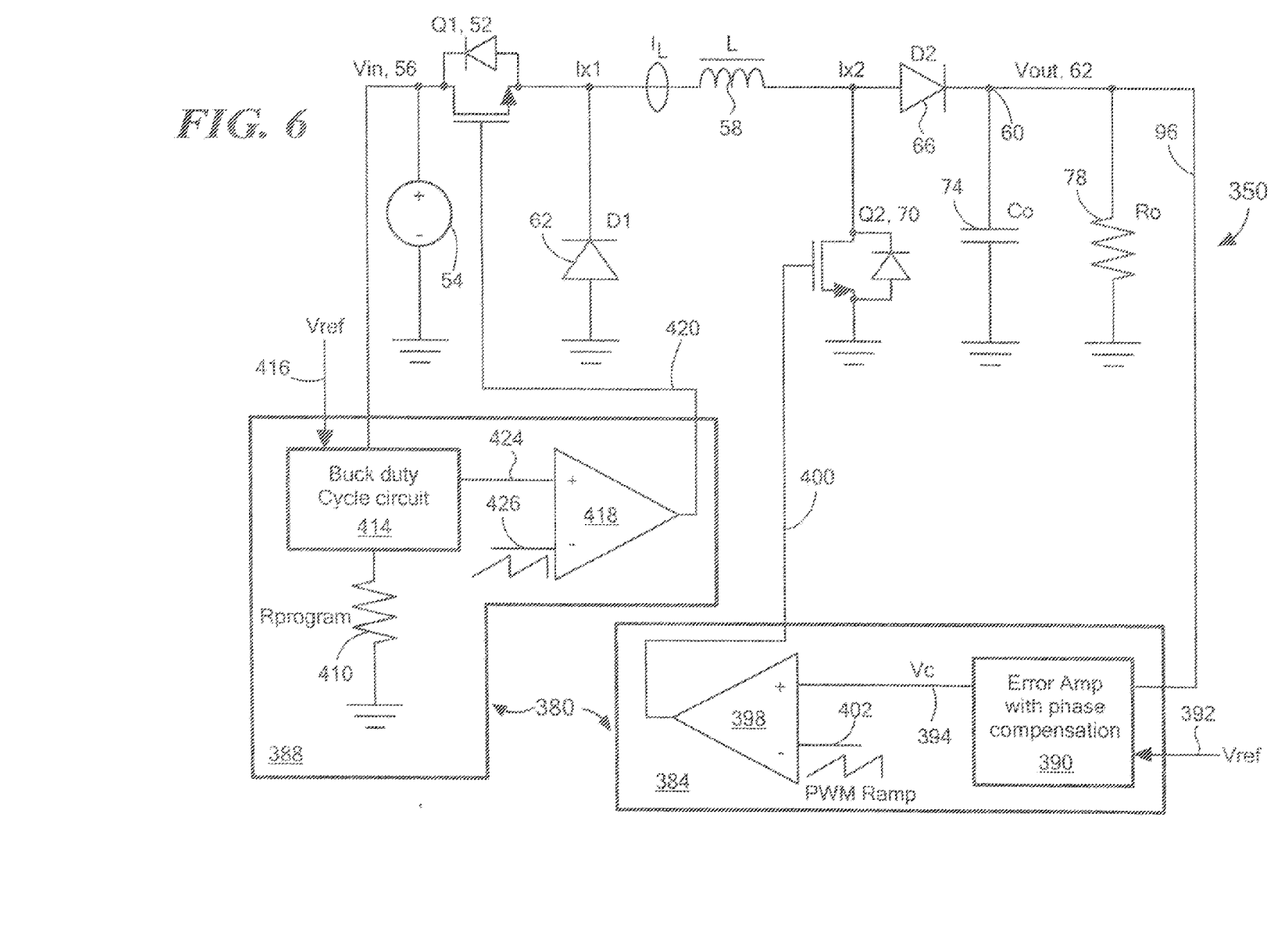
FIG. 6 is a circuit diagram of a Buck-Boost converter in accordance with another embodiment.

One such converter 350 that operates predominantly in the Boost mode of operation is shown in FIG. 6, in which like reference elements with respect to FIG. 2 are shown with like reference numbers. Thus, converter 350 includes Buck switch Q1, 52 coupled between input voltage source 54 that provides an input voltage Vin, 56 and the first terminal 58a of inductor 58, switch 62 coupled between the first terminal 58a of the inductor 58 and ground, switch 66 coupled between a second terminal 58b of the inductor 58 and an output terminal 60 of the converter at which output voltage Vout, 62 is provided, and Boost switch Q2, 70 coupled between the second terminal 58b of the inductor 58 and ground.

Conduction of the switches Q1 and Q2 is controlled by a controller 380, here including a feedback control circuit 384 configured to generate a control signal 400 for Boost switch Q2 and a feed forward control circuit 388 configured to generate a control signal 420 for Buck switch Q1. The feedback control circuit 384 can be the same as or similar to the feedback control circuit 84 of FIG. 2 and thus, can include an error amplifier 390 responsive to a feedback signal 96 from the converter output 60 and to a reference signal Vref, 392 to generate an error signal Vc, 394 proportional to a difference between the feedback signal 96 and the reference signal 392 and a comparator 398 responsive to the error signal 394 and to a PWM ramp signal 402 to generate a control signal 400 for coupling to the gate terminal of Boost switch Q2. Feedback control circuit 84 may implement voltage mode control or current mode control.

The feed forward control circuit 388 is responsive to the input voltage Vin, 56 and is configured to generate a control signal 420 for coupling to the gate terminal of the Buck switch Q1, as shown. The Buck duty cycle $D_{buck}$ established by the control signal 420 is programmable in order to achieve a desired, predetermined, nominal output voltage Vout. To this end, the feed forward control circuit 388 includes a programmable device 410, here shown in the form of a resistor Rprogram, 410, a Buck duty cycle circuit 414 coupled to the programmable device and responsive to a reference signal Vref, 416, and a comparator 418 that is responsive to an output signal 424 of the Buck duty cycle circuit 414 and to a ramp signal 426, as shown. The programmable device 410 is selected based on the desired, predetermined, nominal output voltage Vout and establishes the operational conditions (i.e., the relationship between the relative levels of the input voltage Vin, 56 and the output voltage Vout, 62) under which the converter 350 transitions between the different modes of operation (e.g., between the Boost mode of operation and the Buck-Boost mode of operation).

The desired Buck duty cycle $D_{buck}$ can be expressed as follows:

$$D_{buck} \cong \min\left(\frac{1 - D_{boost}^0}{Vin} \times (V_{out}^0 + V_{fb}), 1\right) \qquad (14)$$

Figure 7:
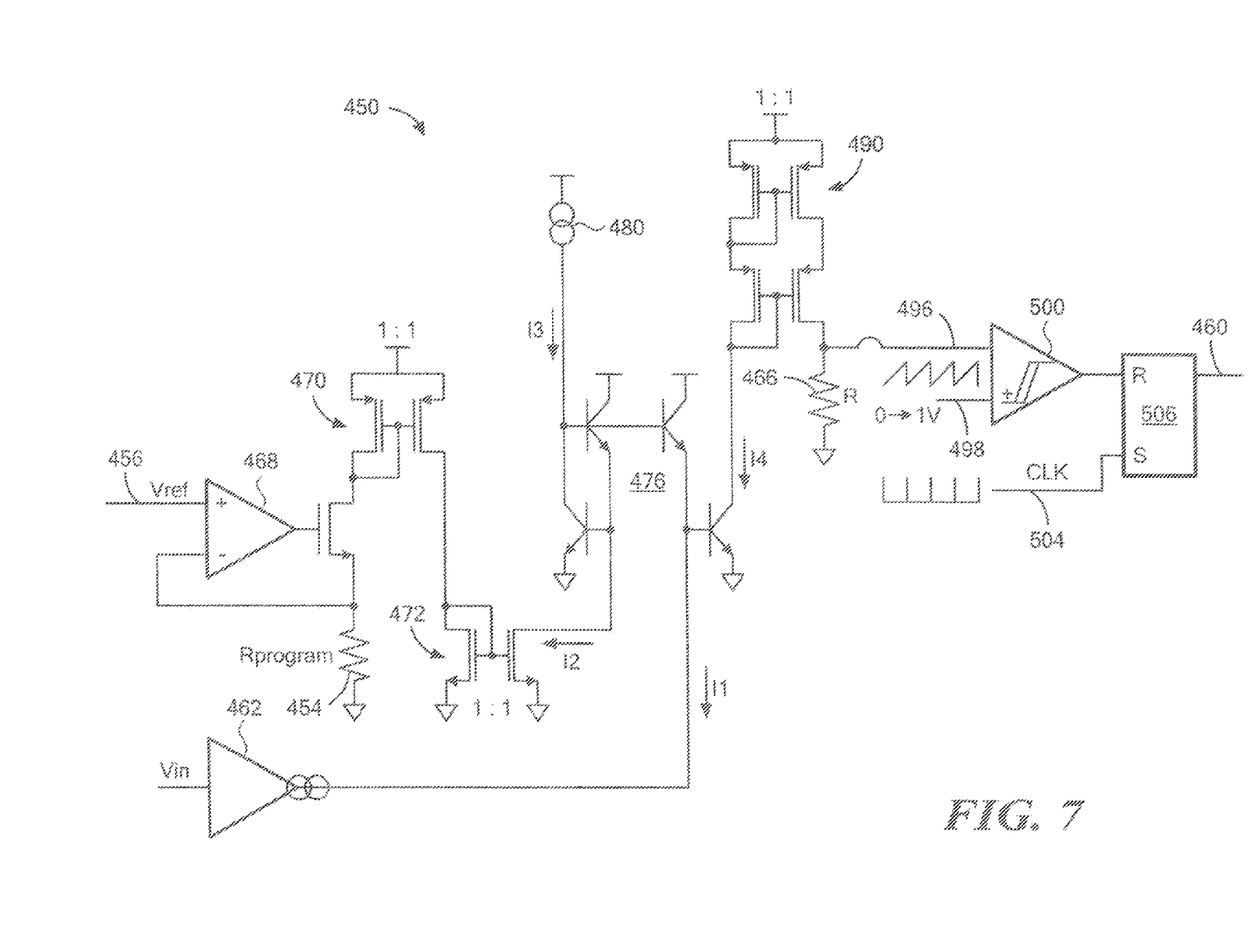
FIG. 7 is a circuit diagram of an illustrative embodiment of the Boost duty cycle circuit of FIG. 6.

Referring also to FIG. 7, an illustrative feed forward control circuit 450 (as may be used to provide the feed forward control circuit 388 of FIG. 6), is shown. Like the circuit 388 of FIG. 6, the circuit 450 includes a programmable device 454, here a resistor Rprogram, and is responsive to a reference signal 456 and the input voltage Vin and is configured to generate a control signal 460 which may be the same as or similar to the control signal 420 (FIG. 6) for coupling to the gate terminal of Buck switch Q1. More particularly, the control signal 460 has a duty cycle given by equation (14) above.

The feed forward control circuit 450 includes a transconductance amplifier 462 to generate a first current I1 equal to the input voltage Vin multiplied by the amplifier's transconductance of 1/(M×R), where R is a resistance of a resistor 466 and M is a multiplier so that I1=Vin/(M×R). A voltage-follower-configured operational amplifier 468 is coupled to the programmable resistor 454 to generate a current proportional to the reference signal voltage Vref, 456 divided by the programmable resistance Rprogram, 454 which current can be buffered with current mirrors 470, 472, as shown, to provide a current I2.

A transistor network 476 configured as a multiplier is responsive to the first and second currents I1 and I2 and to a current source 480 (as may have a current value of 1 volt divided by the resistance of resistor R, 466) to generate a fourth current I4 given by:

$$I4 = \frac{\frac{1V}{R} \times \frac{Vref}{Rprogram}}{\frac{Vin}{M \times R}} \qquad (15)$$

The current I4 is coupled to a first leg of a current mirror network 490 that has the resistor R, 466 in the second leg, as shown. A voltage across resistor 466 generates a signal 496 (which may be the same as or similar to the output signal 424 of the Buck duty cycle circuit 414 (FIG. 6)). The signal 496 can be expressed as a maximum as follows:

$$V_{buck} = \frac{1V}{R_{program}} \times \frac{V_{ref}}{V_{in}} \times R \times M \qquad (16)$$

Signal 496 is coupled to an inverting input of a comparator 500 that has a non-inverting input responsive to a ramp signal 498 (that may be the same as or similar to the ramp signal 426 of FIG. 6) that may, for example, be a ramp signal with a voltage range of zero to 1 volt. The output of comparator 500 can be coupled to a reset input of a flip-flop 506 that is set by a clock signal 504 to generate the control signal 460 for coupling to the gate terminal of the Buck switch Q1 (FIG. 6).

With the feed forward control circuit 450 of FIG. 7, Rprogram is proportional to the desired, predetermined output voltage $V_{out}^0$ and more particularly, can be expressed as follows:

$$R_{program} = \frac{1}{(V_{out}^0 + V_{fb})} \times \frac{V_{ref}}{1 - D_{boost}^0} \times R \times M \qquad (17)$$

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A controller for a Buck-Boost converter comprising a Buck switch coupled between an input voltage and an inductor and a Boost switch coupled to the inductor and through an output switch to an output of the converter at which an output voltage is provided, the controller comprising:
    a feedback control circuit responsive to the converter output and configured to generate a first control signal for one of the Buck switch and the Boost switch; and
    a feed forward control circuit responsive to the input voltage and configured to generate a second control signal for the other one of the Buck switch and the Boost switch, wherein the feed forward control circuit comprises a programmable device selected based on a predetermined level for the output voltage, wherein the feedback control circuit is configured to generate the first control signal for the Buck switch and the feed forward control circuit is configured to generate the second control signal for the Boost switch, and wherein a duty cycle of the Boost switch is based on the value of the input voltage, a desired duty cycle of the Buck switch when the converter transitions between a Buck mode of operation and a Buck-Boost mode of operation, and the predetermined level for the output voltage.

2. The controller of claim 1 wherein the feedback control circuit is configured to generate the first control signal for the Buck switch and the feed forward control circuit is configured to generate the second control signal for the Boost switch.

3. The controller of claim 1 wherein the programmable device comprises a resistor.

4. The controller of claim 2 wherein the duty cycle $D_{boost}$ of the Boost switch is substantially given by:

$$D_{boost} \cong 1 - \frac{D^0_{buck}}{V^0_{out} + V_{fb}} \times Vin$$

where Vin is the value of the input voltage, $V_{fb}$ is a diode drop, $D_{buck}^0$ is a desired duty cycle of the Buck switch when the converter transitions between a Buck mode of operation and a Buck-Boost mode of operation, and $V_{out}^0$ a predetermined level for the output voltage.

5. The controller of claim 1 wherein the feedback control circuit comprises:
an error amplifier responsive to a feedback signal from the converter output and to a reference signal to generate an error signal proportional to a difference between the feedback signal and the reference signal; and
a comparator responsive to the error signal and to a PWM ramp signal to generate the first control signal.

6. The controller of claim 5 wherein the feedback control circuit implements voltage mode control.

7. The controller of claim 5 wherein the PWM ramp signal is based in part on a current through the inductor and the feedback control circuit implements current mode control.

8. A Buck-Boost converter to supply a regulated output voltage at an output node, the converter comprising:
an inductor having first and second terminals;
a first switch coupled between an input voltage and the first terminal of the inductor;
a second switch coupled between the first terminal of the inductor and a reference voltage;
a third switch coupled between the second terminal of the inductor and the output node;
a fourth switch coupled between the second terminal of the inductor and the reference voltage;
a feedback control circuit responsive to the output voltage and configured to generate a control signal for the first switch; and
a feed forward control circuit responsive to the input voltage and configured to generate a control signal for the fourth switch, wherein the feed forward control circuit comprises a programmable device selected based on a predetermined level for the output voltage, wherein the feedback control circuit is configured to generate the first control signal for the first switch and the feed forward control circuit is configured to generate the second control signal for the fourth switch, and wherein a duty cycle of the fourth switch is based on the value of the input voltage, a desired duty cycle of the first switch when the converter transitions between a Buck mode of operation and a Buck-Boost mode of operation, and the predetermined level for the output voltage.

9. The converter of claim 8 wherein the converter is operable in (1) the Buck mode of operation in which the first switch is turned on and off according to a Buck duty cycle and the fourth switch is off; or (2) in the Buck-Boost mode of operation in which the first and fourth switches are on during a first phase and the first and fourth switches are off during a second phase.

10. The converter of claim 9 wherein the duty cycle of the fourth switch is substantially given by:

$$D_{boost} \cong 1 - \frac{D^0_{buck}}{V^0_{out} + V_{fb}} \times Vin$$

where Vin is the value of the input voltage, $V_{fb}$ is a forward voltage drop of the third switch, $D_{buck}^0$ is a desired duty cycle of the Buck switch when the converter transitions between the Buck mode of operation and the Buck-Boost mode of operation, and $V_{out}^0$ a predetermined level for the output voltage.

11. The converter of claim 9 wherein the Buck-Boost mode of operation further comprises a third phase in which the first switch is on and the fourth switch is off.

12. The converter of claim 8 wherein the programmable device comprises a resistor.

13. The converter of claim 8 wherein the feedback control circuit comprises:
an error amplifier responsive to a feedback signal from the converter output and to a reference signal to generate an error signal proportional to a difference between the feedback signal and the reference signal; and
a comparator responsive to the error signal and to a PWM ramp signal to generate the control signal for the first switch.

14. A controller for a Buck-Boost converter comprising a Buck switch coupled between an input voltage and an inductor and a Boost switch coupled to the inductor and through an output switch to an output of the converter at which an output voltage is provided, the controller comprising:
a feedback control circuit responsive to the converter output and configured to generate a first control signal for the Buck switch; and
a feed forward control circuit responsive to the input voltage and configured to generate a second control signal for the Boost switch, wherein a duty cycle $D_{boost}$ of the Boost switch is substantially given by:

$$D_{boost} \cong 1 - \frac{D^0_{buck}}{V^0_{out} + V_{fb}} \times Vin$$

where Vin is the value of the input voltage, $V_{fb}$ is a diode drop, $D_{buck}^0$ is a desired duty cycle of the Buck switch when the converter transitions between a Buck mode of operation and a Buck-Boost mode of operation, and $V_{out}^0$ is a predetermined level for the output voltage.

15. A Buck-Boost converter to supply a regulated output voltage at an output node, the converter comprising:
an inductor having first and second terminals;
a first switch coupled between an input voltage and the first terminal of the inductor;
a second switch coupled between the first terminal of the inductor and a reference voltage;
a third switch coupled between the second terminal of the inductor and the output node;
a fourth switch coupled between the second terminal of the inductor and the reference voltage;
a feedback control circuit responsive to the output voltage and configured to generate a control signal for the first switch; and
a feed forward control circuit responsive to the input voltage and configured to generate a control signal for the fourth switch, wherein the converter is operable in (1) a Buck mode of operation in which the first switch is turned on and off according to a Buck duty cycle and the fourth switch is off; or (2) in a Buck-Boost mode of operation in which the first and fourth switches are on during a first phase and the first and fourth switches are off during a second phase and wherein a duty cycle of the fourth switch is substantially given by:

$$D_{boost} \cong 1 - \frac{D_{buck}^0}{V_{out}^0 + V_{fb}} \times Vin$$

where Vin is the value of the input voltage, $V_{fb}$ is a forward voltage drop of the third switch, $D_{buck}^0$ is a desired duty cycle of the Buck switch when the converter transitions between the Buck mode of operation and the Buck-Boost mode of operation, and $V_{out}^0$ is a predetermined level for the output voltage.

* * * * *

UNITED STATES PATENT AND TRADEMARK OFFICE
CERTIFICATE OF CORRECTION

PATENT NO. : 9,621,041 B2
APPLICATION NO. : 14/615050
DATED : April 11, 2017
INVENTOR(S) : Xiaowu Sun et al.

It is certified that error appears in the above-identified patent and that said Letters Patent is hereby corrected as shown below:

In the Specification

Column 1, Line 29, delete "Buck-Boost, —" and replace with --Buck-Boost, flyback,--

Column 2, Line 44, delete "$D_{buck}{}^0$" and replace with --$D_{buck}^0$--

Column 2, Line 46, delete "$V_{out}{}^0$" and replace with --$V_{out}^0$--

Column 3, Line 28, delete "$D_{buck}{}^0$" and replace with --$D_{buck}^0$--

Column 3, Line 31, delete "$V_{out}{}^0$" and replace with --$V_{out}^0$--

Column 6, Line 2, delete "$V_{out}^0$ and Buck duty target $D_{buck}^0$," and replace with --$V_{out}^0$ and Buck duty target $D_{buck}^0$--

Column 6, Line 19, delete "(i.e., $D_{buck}^0$)" and replace with --(i.e., $D_{buck}^0$)--

Column 6, Line 20, delete "(i.e., $V_{out}^0$):" and replace with --(i.e., $V_{out}^0$):--

Column 6, Line 47, delete "which may the" and replace with --which may be the--

Column 7, Line 33, delete "$V_{out}{}^0$" and replace with --$V_{out}^0$--

Column 7, Line 62, delete "$V_{out}{}^0$" and replace with --$V_{out}^0$--

Column 7, Line 67, delete "(i.e., $D_{buck}^0$)" and replace with --(i.e., $D_{buck}^0$)--

Signed and Sealed this
Tenth Day of April, 2018

Andrei Iancu
*Director of the United States Patent and Trademark Office*

Column 9, Line 37, delete "may the" and replace with --may be the--

Column 10, Line 20, delete "$V_{out}^{0}$" and replace with --$V_{out}^{0}$--

In the Claims

Column 11, Line 12, delete "$D_{buck}^{0}$" and replace with --$D_{buck}^{0}$--

Column 11, Line 15, delete "$V_{out}^{0}$" and replace with --$V_{out}^{0}$--

Column 12, Line 7, delete "$D_{buck}^{0}$" and replace with --$D_{buck}^{0}$--

Column 12, Line 10, delete "$V_{out}^{0}$" and replace with --$V_{out}^{0}$--

Column 12, Line 46, delete "$D_{buck}^{0}$" and replace with --$D_{buck}^{0}$--

Column 12, Line 49, delete "$V_{out}^{0}$" and replace with --$V_{out}^{0}$--

Column 13, Line 14, delete "$D_{buck}^{0}$" and replace with --$D_{buck}^{0}$--

Column 13, Line 17, delete "$V_{out}^{0}$" and replace with --$V_{out}^{0}$--